C. G. & W. STOLL.
Grain Separator.
No. 3,992. Reissued May 24, 1870.
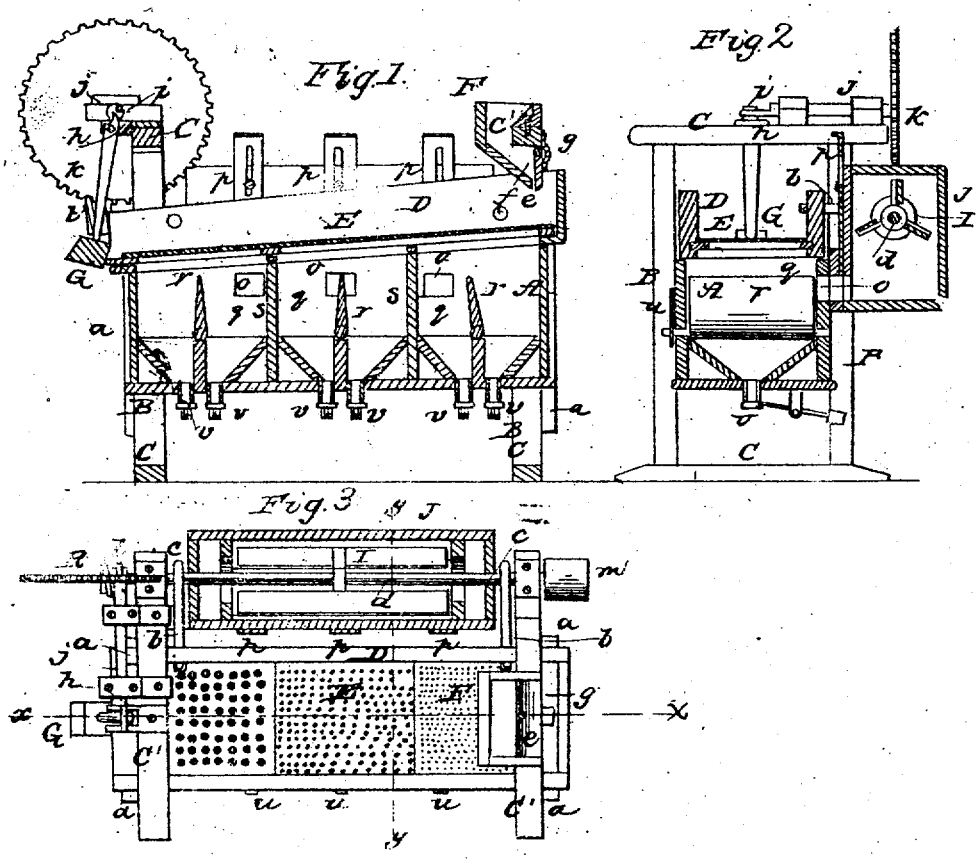
Witnesses
Wm Thauer
Thos Lusch
Inventor
C. G. & W. Stoll
By Munn & Co
Attys

United States Patent Office.

WILLIAM W. STOLL, OF BROOKLYN, NEW YORK, ASSIGNEE, BY MESNE ASSIGNMENTS, OF CHARLES G. STOLL AND WILLIAM STOLL.

*Letters Patent No. 54,263, dated April 24, 1866; reissue No. 3,992, dated Mar 24, 1870*

IMPROVEMENT IN MACHINES FOR SEPARATING GRAIN AND OTHER MATERIALS.

The Schedule referred to in these Letters Patent and making part of the same

*To all whom it may concern:*

Be it known that CHARLES G. STOLL and WILLIAM STOLL, of East New York, in the county of Kings and State of New York, have invented a new and useful Improvement in Machines for Separating Grain and other Materials; and the following is hereby declared to be a full, clear, and exact description therof, which will enable those skilled in the art to make and use the same, reference being had to the accompanying drawing forming part of this specification, in which drawing—

Figure 1 represents a longitudinal vertical section of this invention, the line *x x*, fig. 3, indicating the plane of section.

Figure 2 is a transverse vertical section of the same taken in the plane indicated by the line *y y*, fig. 1.

Figure 3 is a plan or top view of the same partly in section.

Similar letters indicate corresponding parts.

This invention relates to a machine which is intended for separating grain or any other granulated or pulverized material containing parts of different specific gravity, and the action of which depends upon a fan-blower or other mechanism capable of producing a steady blast, in combination with a sieve stretched across the top of a closed box in such a manner that the blast created by the blast mechanism is compelled to pass up through the meshes of the sieve, and to act on the material spread thereon, for the purpose of separation.

The fan, which serves to throw air under the separating sieve, is placed in a closed box, to which the air passes from below in such a manner that the air thrown into the separator is comparatively pure and free from the dust which contaminates the air above the separator. Said fan-box communicates with the space below the separating-sieve through a series of openings, which are opened or closed by suitable gates, and which lead into closed compartments under the sieve intended to receive the material, passing through the meshes of the sieve, said compartments being provided with adjustable loaded or spring valves, which do not allow the contents thereof to discharge until the air has attained a certain pressure suitable to produce the desired effect on the material to be separated.

Each compartment is provided with an adjustable partition, the position of which is indicated by an index and scale on the outside of the box containing the sieve. By adjusting these partitions, the material discharging into each compartment can be separated according to the difference in its specific gravity, the heavy parts passing through the sieve quicker than the light parts.

In the drawing—

The letter A designates a box made of wood or any other suitable material, and supported by uprights B B', which are united at top and bottom by cross-bars C C'.

The top edge of this box is cut off in an inclined direction, and it supports the shoe D, in which the sieve E is fastened. This sieve is made of three (more or less) sections, of different fineness, the section on the upper end being the finest.

The shoe D is supported by four springs, *a*, of wood or any other suitable material, which are securely fastened to the uprights B B', and it connects, by rods *b*, with cranks *c*, in a shaft, *d*, so that, by turning said shaft, a lateral shaking motion is imparted to the sieve.

The material to be separated is conducted to the sieve through a hopper, *e*, which has a long narrow discharge opening, *e*, causing the material to flow in a broad shallow stream, extending clear across said sieve, or nearly so.

One side of this hopper forms a valve, *f*, which is held closed by a spring, *g*, thus allowing it to yield, if a thick lump or some other impurities should come opposite the opening *e*, and by these means a choking up of said discharge opening is prevented.

A hammer, G is arranged opposite the lower end of the sieve, being suspended from a pivot in a bracket, *h*, secured to one of the cross-bars C.

A cam, *i*, which is secured to the end of a shaft, *j*, and which, on being revolved on said shaft, comes in contact with a nose on the upper end of the helm of the hammer, causes said hammer to rise at certain intervals, and to descend with considerable force, thereby producing an end shake of the sieve, which prevents the grain or other material from choking.

The shaft *j*, to which the cam *i* is attached, receives its motion by a large worm-wheel, *k*, which gears in a worm, *l*, on the blower-shaft *d*, said blower-shaft being caused to revolve by a belt stretched over a pulley, *m*, which is mounted on its end, and to which motion is imparted by a steam-engine, horse-power, or any other suitable motor.

The blower I, which is mounted on the shaft *d*, is inclosed in a box, J, to which access is had through a covered channel, *n*, from below, in such a manner that all the air which passes to the blower is taken from below, the air above being saturated with dust rising from the machine, and, by the action of the comparatively pure air thus injected into the box A, the separation of impurities from grain or other materials is facilitated.

The blower I communicates with the box A by three (more or less) apertures, *o*, which are adjustable, or which can be opened or closed by means of gates *p*. Each of the apertures *o* communicates with one of the compartment or chambers *q*, into which the box A is divided up by partitions s. Each of these compartments corresponds in size and position to one of the sections of the sieve E, and each compartment is also provided with an adjustable valve or partition, r, secured to a rock-shaft, which has its bearings in the sides of the box A.

On the outer end of each rock-shaft is mounted an index, u, which travels over a suitable scale, by means of which the position of the partition or valve can be determined without opening the box A. The object of these movable partitions is to separate the grain or other material passing into one of the compartments according to its fineness or specific gravity.

If the adjustable partition in one of said compartments is placed in a vertical position, the quantity of grain or other material collecting in this particular compartment is divided in two equal parts, that portion in the upper half of the compartment being somewhat finer than that in the lower compartment.

If it is desired to obtain a large quantity in the upper part of the compartment, the adjustable compartment is turned down toward the lowest end of the sieve, and, if it is desired to obtain the largest quantity in the lower part of the compartment, the adjustable partition is inclined upward toward the highest part of the sieve. By this arrangement the operator is enabled to obtain six different grades of fineness, if the box A is divided in three compartments, and the quantity collecting in each portion of the several compartments can be regulated at pleasure.

Each of the compartments or chambers q of the box A is provided with two valves, v, one on either side of the movable partition, and these valves are closed by weights or springs, which are so adjusted that they do not open until a certain quantity of material has accumulated on them. By this arrangement the air, acting on the material to be separated, preserves a certain pressure, and its full benefit is obtained. By adjusting the weights or springs acting on the valves, the pressure of air obtaining in the chamber can be regulated to suit the material to be separated, the sieves being placed on the box A, so that the air forced into said box is compelled to pass through the apertures in the sieve, and to act with its full force on the material spread over said sieve, the pressure of the blast being so regulated that the heavy parts of the material to be separated pass down through the apertures of the sieve, while the light parts are kept up and caused to discharge over the lower end of the sieve.

What is claimed as new, and desired to be secured by Letters Patent, is—

1. The combination of the sieve E with the closed box A and the fan-blower I, or other equivalent device, substantially as described, so that the air forced into said box has no way to escape except through the apertures in the sieve, and it is compelled to act on the material placed on said sieve with its full force.

2. The yielding spring valve f, in combination with the long shallow discharge opening in the bottom of the hopper, and with the sieve E, constructed and operating substantially as and for the purpose set forth.

3. The closed box A, to which the air has access from below, in combination with the fan I, box A, and sieve, constructed and operating substantially as and for the purpose described.

4. The adjustable valves or partitions r, in the compartments q of the box A, in combination with the sieve E, constructed and operating substantially as and for the purpose set forth.

5. The air-valves v i in the bottom of the box A, in combination with the blower and sieve, constructed and operating substantially as and for the purpose described.

This specification signed by me this 22d day of April, 1870.

WILLIAM W. STOLL.

Witnesses:
W. HAUFF,
E. F. KASTENHUBER.